(12) United States Patent
Cartier et al.

(10) Patent No.: US 6,795,543 B1
(45) Date of Patent: Sep. 21, 2004

(54) INTELLIGENT ROUTING TO AUTOMATE HANDLING OF OPERATOR-REQUESTED CALLS

(75) Inventors: Veronica Ann Cartier, Alexandria, VA (US); James A. Manuel, Brookeville, MD (US); Margaret Malagon, Bergenfield, NJ (US)

(73) Assignee: Verizon Services Corp., New York, NY (US)

( * ) Notice: Subject to any disclaimer, the term of this patent is extended or adjusted under 35 U.S.C. 154(b) by 527 days.

(21) Appl. No.: 09/612,413

(22) Filed: Jul. 7, 2000

(51) Int. Cl.[7] ................................................. H04M 3/60
(52) U.S. Cl. ............. 379/219; 379/218.01; 379/265.01; 379/260
(58) Field of Search ............................... 379/219, 88.01, 379/88.03, 201.01, 201.02, 265.01, 265.02, 221.01, 211.02, 212.01, 218.01, 223, 260

(56) References Cited

U.S. PATENT DOCUMENTS

| | | |
|---|---|---|
| 4,922,519 A | 5/1990 | Daudelin |
| 5,353,335 A | 10/1994 | D'Urso et al. |
| 5,479,488 A | 12/1995 | Lennig et al. |
| 5,502,759 A | 3/1996 | Cheng et al. |
| 5,572,583 A | 11/1996 | Wheeler, Jr. et al. |
| 5,586,177 A | 12/1996 | Farris et al. |
| 5,594,784 A | 1/1997 | Velius |
| 5,638,425 A | 6/1997 | Meador, III et al. |
| 5,719,921 A | 2/1998 | Vysotsky et al. |
| 5,850,432 A | 12/1998 | Desai et al. |
| 5,859,900 A | 1/1999 | Bauer et al. |
| 5,881,134 A | 3/1999 | Foster et al. |
| 5,892,820 A | 4/1999 | Armstrong et al. |
| 5,895,448 A | 4/1999 | Vysotsky et al. |
| 5,898,771 A * | 4/1999 | Florindi et al. ............. 379/260 |
| 5,982,865 A | 11/1999 | Creamer et al. |
| 5,987,118 A | 11/1999 | Dickerman et al. |
| 6,002,754 A | 12/1999 | Jaiswal et al. |
| 6,137,869 A * | 10/2000 | Voit et al. ..................... 379/114 |
| 6,167,119 A * | 12/2000 | Bartholomew et al. ..... 379/207 |
| 6,317,484 B1 * | 11/2001 | McAllister ............... 379/88.02 |
| 2001/0024496 A1 * | 9/2001 | Bolduc et al. |

* cited by examiner

*Primary Examiner*—William J. Deane, Jr.
(74) *Attorney, Agent, or Firm*—Leonard Suchtya, Esq.; Joel Wall, Esq.; Rader Fishman & Grauer

(57) ABSTRACT

A control resource, such as a service control point, causes a telephone network to route calls, initiated by an explicit request for operator service, to a front-end automation platform. The platform provides an announcement, typically in the form of a menu identifying available services. If the platform receives a signal from a caller selecting one of the services, the platform converts the call from an operator service call to a type of call associated with the selected service. The network then routes the call as converted, through the network to a predetermined resource for providing the selected service. The menu announcement and service selection processing with subsequent call conversion help take as many operator service calls as possible away from the operator switch and instead route many calls directly to the appropriate department, emergency destination or automated resource.

29 Claims, 7 Drawing Sheets

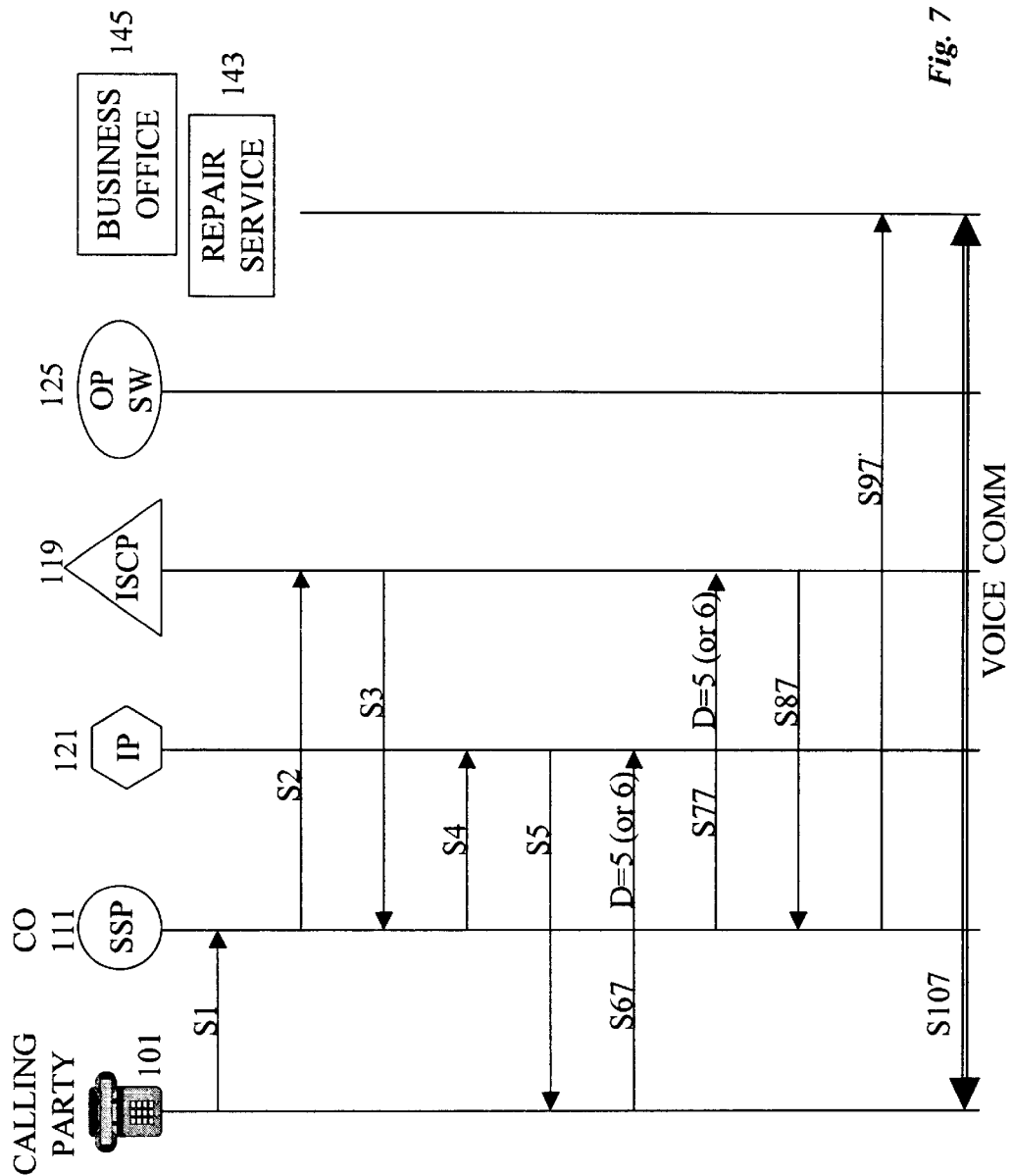

INTELLIGENT ROUTING TO AUTOMATE HANDLING OF OPERATOR-REQUESTED CALLS

TECHNICAL FIELD

The present invention relates to automated handling of telephone calls or the like initiated by a service request, which normally signifies an explicit request for an operator, for example by dialing of a 0 without more digits (0– call). Certain aspects of the invention relate to intelligent network type handling of such calls, for example, by triggering access to a control resource on a signaling network in response to the operator request and then processing the call through a front-end platform to automate selective processing of such calls.

ACRONYMS

The written description uses a large number of acronyms to refer to various services, messages and system components. Although generally known, use of several of these acronyms is not strictly standardized in the art. For purposes of this discussion, acronyms therefore will be defined as follows:

Advanced Intelligent Network (AIN)
Automated Alternate Billing Service (AABS)
Automatic Number Identification (ANI)
Call Completion (CC) operator
Call Processing Record (CPR)
Central Office (CO)
Common Channel Interoffice Signaling (CCIS)
Common Channel Signaling (CCS)
Competitive Local Exchange Carrier (CLEC)
Data and Reporting System (DRS)
Directory Assistance (DA)
Generic Data Interface (GDI)
IntereXchange Carrier (IXC)
Integrated Service Control Point (ISCP)
Integrated Services Digital Network (ISDN)
Intelligent Peripheral (IP)
Line Identification Data Base (LIDB)
Local Access and Transport Area (LATA)
Local Exchange Carrier (LEC)
Multi-Services Application Platform (MSAP)
Operate Services Position System (OSPS)
Plain Old Telephone Service (POTS)
Point in Call (PIC)
Point of Presence (POP)
Prefix Digit Interpreter Table (PDIT)
Primary Rate Interface (PRI)
Public Safety Answering Point (PSAP)
Public Switched Telephone Network (PSTN)
Service Control Point (SCP)
Service Creation Environment (SCE)
Service Management System (SMS)
Service Switching Point (SSP)
Signaling System 7 (SS7)
Signaling Point (SP)
Signaling Transfer Point (STP)
Simplified Message Desk Interface (SMDI)
Traffic Operator Position Switch (TOPS)
Transaction Capabilities Applications Part (TCAP)
Trunk (TR)

BACKGROUND

Although modern technological developments offer an increasing variety of sophisticated data communications, the plain old telephone service (POTS) call remains the most common form of human-to-human communication. Many types of telephone calls originally required assistance from a live network operator. Many of these services have been automated. For example, if a caller dials a 0 followed by a ten-digit destination number, the telephone network typically routes the call to an automated alternate billing service (AABS). The AABS platform provides a prompt and collects additional information to facilitate one of several available automated billing procedures. The AABS platform and its automated handling can provide collect call processing, bill to third party processing or credit/calling card billing.

Originally, such services required live operator assistance. Today, however, the 0+ dialing pattern routinely signifies a request for automated processing and no longer can be viewed as involving an explicit request for an operator service. Typically, the caller reaches an operator only in the default situation in which the automated handling is unsuccessful for some reason.

In the modern competitive telecom environment, many different carriers provide competing toll services. In many cases, the customer subscribes with one service provider for intra-LATA tolls, for example with the local exchange carrier; but the subscriber receives inter-LATA service from a different carrier (often identified as an inter-exchange carrier or IXC). Although there is some increasing competition for the intra-LATA toll call services, most often these calls can still go to the AABS equipment of the LEC. However, there are many different companies that provide the inter-LATA service, most of which now deploy their own AABS type systems. If the caller dials 0+ ten digits, the end office examines the dialed digits of the destination, determines if the call is an inter-LATA or an intra-LATA call, and then routes the call to the preferred carrier that has been pre-selected or picked for the particular type of toll call. Consequently, 0+ calls from any one geographic area must be routed to many different AABS systems and/or operators of the different carriers, based on subscriber selections of carriers for the relevant types of services.

The telephone industry also has developed a variety of systems providing automated directory assistance. This is not an operator service request but a request for directory service. The caller dials a number such as 411 for the directory assistance system. The network connects the caller's station to a computer system, which receives speech or dialed inputs identifying the city and name of the desired party. A specially trained directory assistance operator may come on-line at some point to refine the search. An operator may select the listing from a directory database based on the caller inputs, but with little or no actual conversation with the caller. In some advanced systems, the computer automatically looks up the listing corresponding to the input information in the directory. In either case, the automated equipment provides a synthesized speech announcement of the telephone number of the desired party.

Many of the automated directory assistance systems also offer an automated call completion service. In such a case, when the system announces the destination number, the system also prompts the caller asking if the caller would like for the system to complete the call. The caller assents by dialing a specified digit, by saying "yes" or by simply staying on the line for a set interval. Upon detecting assent to the call completion service, the directory assistance system automatically routes the call through the telephone network using the identified destination number obtained from the directory database.

Although AABS systems and automated directory assistance systems have eliminated live-operator handling on many common types of calls, many users still initiate calls by simply dialing a 0. A call in which the customer dials 0 and waits for a network action is referred to as a "0–" (zero minus) call. In existing telephone networks today, when a customer picks up the handset of the telephone and dials a 0 only, the telephone service provider's network routes the call to an operator switch. The operator switch in turn routes the call to an operator position station. The operator position includes telephone equipment to allow a live operator to answer the voice call and converse with the calling customer. The operator position also includes data terminal equipment to allow the operator to perform related functions, such as busy verification or looking information up in a database of services that the provider offers to its customers.

Quite often, the customer makes a 0– call because the customer does not really know how to make a particular type of call in accord with the more modem procedures. The 0– caller may be seeking to make a collect call, credit card call or a bill to third party call but be unfamiliar with the 0+ dialing procedure for using the AABS system. Although the operator can handle such calls in some cases, the 0– dialing process prevents the use of the AABS equipment on the call. Also, the normal 0– routing directs the call to the operator provided by the local exchange carrier (LEC). If the caller desires to make a special toll call, the call needs to go through the operator and/or billing system and network of the preferred carrier picked by the calling subscriber, which may or may not be the LEC. The LEC operator must transfer the call if a carrier network other than the LEC network would provide the toll service, for example, if the call is an inter-LATA call.

In a similar manner, many people seeking directory assistance use a 0– call, without dialing the directory assistance number (e.g. 411). The 0– dialing for directory assistance bypasses any automated equipment available for directory assistance calls and takes the caller directly to a live operator. Also, not all operators are trained or have access to the resources for all types of service.

0– calls normally go to a call completion (CC) operator. The call completion operator normally handles calls that will be completed to other destinations, for example with a special billing procedure, to the business office and/or to the repair service. Directory assistance (e.g. 411 ) calls normally go to a different operator specifically set-up for handling directory assistance. Hence, if the caller uses 0– dialing the call completion operator must transfer the call to a directory assistance operator. Similar transfers are necessary for callers trying to reach the business office or repair service of their local carrier.

The use of 0– on calls that should otherwise go through automated systems increases the need for network operators and increases the personnel costs of telephone carriers. Transfer of 0– calls to other carriers or to other operators or carrier personnel increases the need for call completion operators and unnecessarily ties-up network resources.

Also, 911 service has become the common best mode for initiating calls to emergency services such as fire and police. Modem telephone networks now route 911 calls directly to a public safety answering point (PSAP) staffed by emergency response personnel having direct communication with fire and police departments in the area. The telephone network also provides information to the PSAP to identify the calling station and thereby enabling the PSAP equipment to precisely determine the location of an emergency.

Despite the wide acceptance of 911, many people still dial the 0– operator in an emergency. The telephone network, however, does not treat 0– calls as priority calls and simply routes such calls to the next available operator. At the very least, the 0– handling delays the emergency handling of the call while the caller interacts with a telephone network operator, rather than going directly to the personnel at the public safety answering point (PSAP). Typically, the 0– call completion operator will stay on the line while the call is handled by the personnel at the PSAP, in case further assistance is necessary.

Clearly, a need exists to automate the handling of as many different types of operator assistance calls as is practical. A more specific need exists for an efficient technique to convert at least some types of operator assistance calls (0– calls or the like) into calls amenable to automated handling by existing systems. For example, it would be desirable to convert a 0– call to a 0+ call for an AABS system or a call to a directory assistance system or operator. Another need is to convert certain 0– calls to calls going directly to certain selected destinations. This later need is particularly critical for calls for emergency services to go directly to a PSAP or the like, essentially as if the caller had in fact dialed 911. However, it would lesson the need for operators and reduce burdens on the network if certain 0– calls were converted to go directly to the carrier's business office or repair service.

SUMMARY OF THE INVENTION

The present invention addresses the above stated needs and overcomes the problems with the prior telephone systems by automating the handling of calls involving a request for operator services, e.g. 0– calls. The telephone network is upgraded, for example by programming a control resource, to process operator requests to route those calls to an automated front-end system. The front-end system provides a menu of common services currently requested of operators. A typical list of these services might include emergency service calls (e.g. 911), alternate billing calls, calls for directory assistance, request for busy verification, calls to the telco repair service office and calls to the telco business office. Of these common services, only the calls requesting busy verification need go to a traditional 0– type call completion operator.

The front system receives menu selections from callers and enables the network to route the calls in accord with the menu selections. Essentially, the system converts most of the operator service calls into direct calls for the other types of services. The calls are directly routed from the caller's central office to the destination selected (e.g. PSAP, repair or business office) or to the appropriate automated system (e.g. AABS or directory assistance). When appropriate, the processing also routes calls to subscriber-selected carriers for particular types of toll services.

Thus, one aspect of the present invention relates to a call processing method for use in a telephone network. When one of the network central offices receives an explicit request for an operator service, it will trigger access to a control resource, and route the call to a front-end call processing platform. The platform provides an announcement, typically the menu identifying available services. If the platform receives a signal from a caller selecting one of the services, the platform converts the call from an operator service call to a type of call associated with the selected service. The central office then routes the call as converted, through the network to a predetermined resource for providing the selected service.

The control resource may be distributed, for example in the network office switches, but preferably is centralized. The centralized control resource may reside in one of the central office switches of the network but preferably resides in a remote central node on the signaling network. The front-end processing resource may be distributed, for example by using adjuncts associated with or platforms within the central office switches. Preferably, the front-end processing resource also is centralized, for example in an intelligent peripheral (IP), a service circuit node (SCN) or the like.

Hence, although the improved operator service handling may utilize switch features and switch-based announcement platforms, the presently preferred embodiments utilize advanced intelligent network (AIN) technology.

In general, AIN type call processing relies heavily on signaling communication via an interoffice signaling network and call processing information stored in a central database. In an AIN type system, local and/or toll offices of the public telephone network detect one of a number of call processing events or points in calls (PICs) identified as AIN "triggers". For ordinary telephone service calls, there would be no event to trigger AIN processing; and the local and toll office switches would function normally and process such calls without referring to the central database for instructions. For purposes of the present invention, central offices will recognize an operator service request, typically a 0– dialing plan, as a trigger. Any such office, which detects a trigger, suspends call processing, compiles a call data message and forwards that message via a signaling link to the central database control resource. The control resource, for example, comprises an Integrated Service Control Point (ISCP) which includes a Multi-Services Application Platform (MSAP) database functioning as a service control point (SCP). If needed, the ISCP can instruct the central office to obtain and forward additional information, such as the destination number for an alternate billing service. Once sufficient information about the call has reached the ISCP, the ISCP accesses its stored data tables in the MSAP database to translate the received message data into a call control message and returns the call control message to the office of the network via the signaling network. The network offices then use the call control message to complete the particular call.

In an embodiment of the invention utilizing this AIN technology, the SCP or ISCP serves as a centralized implementation of the control resource for the automated handling of the operator service call. Access to the central control database at least controls the routing of the operator service call to the front-end platform and may be used to control certain functions of that platform.

In the AIN preferred embodiment, the front-end functions still might reside in the switches, but preferably the front-end platform comprises one or more intelligent peripherals (IPs). The IP provides the menu and input collection functionality. Based on the caller selection, the ISCP instructs a central office switch to route each call. Only a few calls remain operator service calls, either because of a default condition or because the caller specifically selected a service like busy verification that is provided by a call completion operator. The other types of calls are converted for appropriate routing to other resources.

The preferred embodiment takes advantage of a "nature of number" parameter commonly utilized in the signaling messages for call processing, in order to effect the desired conversions. When the caller requests an operator, the original signaling message contains an "operator request— no digits" present value for the nature of number parameter. If the caller selects any option not requiring the call completion operator in response to the menu, the control resource uses a different nature of number together with a new set of routing digits, in the instruction to the switch to reroute the call. The nature of number value in that instruction facilitates normal network routing to the appropriate resource corresponding to the new set of digits, as if the caller had originally dialed the appropriate digits for routing to that resource.

For example, if the caller selects an alternate billing option, the instruction for rerouting the call contains a nature of number for "national number plan—operator requested." This is the same nature of number value as if the caller had dialed 0+. If the caller has now input destination number digits through interaction with the IP, the central office can route the call to the appropriate carrier and/or AABS system as if the caller had dialed 0+ the digits of the destination number.

For an emergency call, the control resource provides an instruction with a nature of number value identifying "national number plan" and the digits 911, enabling the switch to route the call directly to the PSAP serving the caller's area. Similarly, for directory assistance, the control resource provides an instruction with the nature of number identifying the national number plan and the digits 411, enabling the switch to route the call to a directory assistance operator or automated directory assistance system in the caller's area. For callers requesting the business office or the repair service, the control resource provides an instruction with the nature of number value identifying the national number plan and the destination digits for the business office or the repair service.

As a result of the inventive call processing, many calls are automatically routed to the appropriate personnel, carrier or automated system, without tying-up operators or resources going to and from an operator services switch. This reduces the number of operators required and reduces the burden of operator calls on network resources. When necessary, the network routes converted calls to appropriate pre-selected carriers in accord with existing subscriber picks. Also, such an automated approach to operator service calls provides faster routing for many of the callers.

Additional objects, advantages and novel features of the invention will be set forth in part in the description which follows, and in part will become apparent to those skilled in the art upon examination of the detailed description and the drawings or may be learned by practice of the invention. The inventive objects and advantages may be realized and attained by means of the instrumentalities and combinations particularly pointed out in the appended claims.

BRIEF DESCRIPTON OF THE DRAWINGS

The drawing figures depict the present invention by way of example, not by way of limitations. In the figures, like reference numerals refer to the same or similar elements.

FIG. 7 is a signal flow diagram useful in explaining the flow of call processing for a call to repair service or to the carrier's business office.

DETAILED DESCRIPTION OF THE PREFERRED EMBODIMENTS

The inventive approach involves a front-end automation of the call processing responsive to explicit operator service requests, to take as many of such calls as possible out of the operator switch and instead route the calls directly from the caller's serving central office to the appropriate department, emergency destination or automated resource.

Figure 1:
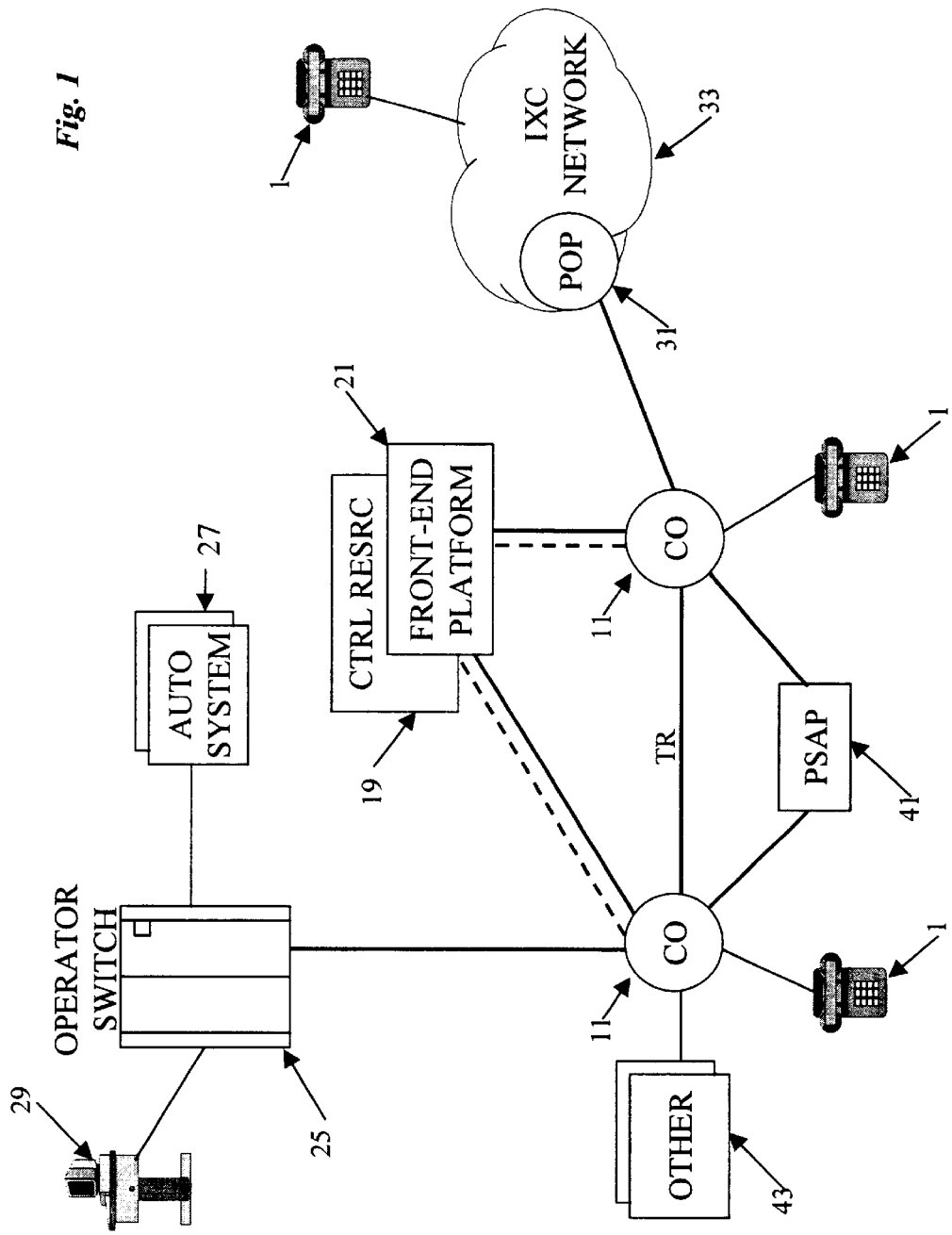
FIG. 1 is a simplified block diagram of a telephone network, useful in explaining the concepts of the present invention.

FIG. 1 is a simplified block diagram of a telephone network providing switched telephone services to telephones 1. The majority of the illustrated network is that of a local exchange carrier (LEC). The LEC network for example includes a number of central office (CO) switching systems 11 connected together through interoffice trunk circuits TR. Although the network will typically include tandem offices, for purposes of discussion, only the end office COs are shown. In accord with the invention, the network also includes a programmed control resource 19 and a front-end call processing platform 21.

The COs 11 route 911 calls directly to a PSAP 41. The drawing also shows other destinations 43, which may be commonly requested, of call completion operators. Examples of these other destinations 43 include the business office of the carrier or a network repair service. Normally, callers can direct dial these destinations, if they know the correct numbers.

The LEC network also has an operator switch 25. The switch 25 may route certain calls to one or more automated systems 27, for example for alternate billing or for automated directory assistance. The switch 25 also distributes operator service calls among operator position terminals 29, only one of which is shown for convenience.

In some cases, the COs 11 route toll calls to other carriers' networks, for example to the point of presence (POP) 31 on the inter-exchange carrier (IXC) network 33. This includes some calls initiated by operator service requests.

Interoffice calls may use in-band signaling over the trunks or out of band signaling via an interoffice signaling network, such as common channel signaling (CCS) network or a common channel interoffice signaling (CCIS), using signaling system 7 (SS7) links (not shown). The operator switch 25 may have such out-of-band signaling capability, or as illustrated, the signaling to/from that switch may use in-band signaling over the trunks.

Normally a 0– call for an operator is routed through the operator switch 25 to one of the operator position consoles 29. In accord with the invention, when a central office (CO) 11 of a telephone network receives an explicit request for an operator service without more digits from a station 1, it will trigger access to the control resource 19, and routing of the call to the front end call processing platform 21. The platform 21 actually operates as a front-end for processing a call before any routing through an operator position switch. The caller will be welcomed to the system with a customized brand and prompted by an automated voice response unit. The prompt may offer the caller a menu of options, to which the caller may respond at any point, that is to say barge in, to make a selection of a desired option. If the platform 21 receives a signal from a caller at a station 1, selecting one of the services, the platform converts the call from an operator service call to a type of call associated with the selected service. The central office then routes the call as converted.

In many cases, the prompt and selection process serves to collect information enabling the platform 21 to convert the operator call to another form of call, and the network routes the call directly from the caller's central office to the appropriate resource for further processing. Certain calls may still be routed through the operator switch 25, but even those calls can often be efficiently directed to a specifically desired resource such as one of the automated systems 27 or an operator position terminal 29 for a directory assistance operator or a call completion (CC) operator. Other calls may be redirected to non-operator services locations 43 of the carrier, such as the repair service or the business office. The platform 21 also converts 0– emergency calls to 911 calls for direct routing to the PSAP 41.

As outlined above, call processing in accord with the invention requires recognition of some type of caller action as an explicit request for an operator service, which will cause a CO 11 to access the control resource 19. There are a number of ways that a caller might explicitly request an operator service. The COs 11 could be programmed to recognize certain events as operator service requests, for example, an off-hook followed by no dialed digits for some relatively long period of time. Another approach is to detect a spoken request for an operator.

The most common explicit request for operator service involves the 0– dialing pattern. An end office type CO 11 measures the time period after each dialed digit. Normally, the CO 11 receives digits until it has enough digits to determine how it must route the call. However, if an actual time period following a digit exceeds a predefined inter-digit delay, the CO 11 assumes that the caller stopped dialing. For purposes of discussion here, this means that the CO 11 can recognize that a caller dialed a 0, and then if the subsequent time interval exceeds the predefined inter-digit delay, the CO 11 recognizes the 0– dialing pattern. Stated another way, the CO 11 recognizes a dialed 0 followed by silence exceeding the predefined inter-digit delay as an explicit request for an operator service. Conversely, if the CO 11 receives a dialed 0, and before expiration of the inter-digit delay period it receives another digit, the CO processes the call as a 0+ call.

Preferably, the CO detecting an operator request will access some type of centralized control resource, however, this resource could be distributed throughout the network or even within the switches in the COs. In the presently preferred embodiment discussed more later, the routing responsive to an explicit operator service request directs such a call to the platform 21 using intelligent network type call processing. In such an implementation, the control resource 19 takes the form of a central database coupled to the interoffice signaling network.

However, there are other control resources and attendant routing techniques that may be used. For example, the processor of the end office might be programmed to control the routing to the front-end processing platform 21. An end office CO 11 normally has a routine for 0– calls, which causes the end office to directly connect a station 1 that has dialed 0– to a specified trunk. In the existing network, each such 0– trunk could extend to an operator switch. In accord with the invention, however, the trunks used for 0– calls would extend to a front-end platform 21. These could be external trunks from one or more switches extending to a centralized platform, as shown for convenience in FIG. 1. Alternatively, the 0– routine could instruct the CO 11 to connect to an external resource that is hosted from a different CO, using an Intelligent Peripheral protocol; As another alternative, the 0– routine could connect the call to an announcement/digit collection platform within each switch itself.

The front-end platform 21 is a processor based system having appropriate elements for providing announcements to callers and collecting input information from callers, via telephone connections through the COs 11. The platform 21 at least receives input information in the form of dialed digit information, and preferably the platform 21 is capable of receiving and recognizing spoken inputs. The platform typically will take the form of some type of adjunct processor, however, in a prototype implementation, announcement and digit collection systems within the switch of a CO 11 were used.

In most cases, the platform 21 receives the caller selection, and the control resource 19 and/or the platform 21 converts the call to an appropriate non-operator call by providing information to a central office 11 of the network to enable routing in accord with the selection. In a few situations, the platform 21 may still instruct the end office CO 11 to route the call to an operator position 29. However, even in some of those cases, the processing can often provide added information to insure routing to an appropriate operator, e.g. directory assistance or call completion (CC).

To facilitate instructing the CO 11 to redirect calls in the appropriate manner, the call processing in accord with the invention manipulates a call processing parameter value utilized in certain signaling messages. The parameter is referred to a "nature of number." The inventive call processing utilizes the following nature of number values: no digits present operator request (sometimes referred to as operator request—no digits), national number operator request.

For example, when a CO 11 detects an operator service request, such as a 0– dialing pattern, it signals the control resource with a message indicating a no digits present operator request. When the control resource 19 sees the no digits present type operator request identified as the nature of number, the control resource assumes that there are no digits dialed included within the query message or that any digits included in the dialed digit field are irrelevant.

Normally, when there is a national number operator request, the messaging will include three or ten digits relating to the operator services request, for example to identify a desired destination. This enables routing to an automated system or an operator of the pre-selected carrier and supplying the destination number to that system or operator for further processing. For alternative billing service calls, the processing in accord with the invention converts a call to a special billing call, by changing the nature of number to national number operator request and adding digits, typically digits that the caller inputs to the front-end platform 21 in response to a further prompt. For several other types of calls, the inventive methodology converts the nature of number to national number plan and provides the CO 11 with the digits for a particular destination, such as 911 for emergency, 411 for directory assistance, or the telephone number for the business office or the repair service.

It may be helpful now to discuss the flow of call processing for several of the most common examples of calls handled in accord with the invention, with particular emphasis on the menu, the caller selection and the conversion of the operator service calls. When a CO 11 routes an operator services call to the platform 21, the first prompt in the menu typically asks if the call is an emergency call, e.g. for 911 service. If the caller selects this first option, the control resource 19 or the front-end platform 21 converts the call to a 911 call, by providing the office with the 911 digits and designating national number plan as the nature of number. In response, the central office 11 routes the call as a 911 call to the PSAP 41. From the perspective of the PSAP, the call appears like a direct dialed 911 call, and the PSAP 21 receives the identification information for the calling line with the call, to enable location identification.

The menu might next provide an option relating to alternate billing services like calling card or collect call billing for toll calls. If the caller chooses this option, the platform may provide a further prompt, and the caller inputs the destination number. The system instructs the central office 11 to route the call as a 0+ call and forwards the destination digits to the CO 11. The instruction to the CO 11 also identifies the nature of number as national number operator request.

In the automated billing type situation, when the end office CO 11 gets the call back from the platform 21, the call now looks exactly like an otherwise normal 0+ call. The end office CO 11 looks at the calling party number and the destination number and determines the type of toll call involved. The CO 11 identifies the carrier selected for the particular type of toll call by the subscriber of the calling line. Consequently, the network will actually route the call to an operator switch and/or billing system of the inter-LATA or intra-LATA carrier preferred or picked in advance by the subscriber for the particular type of toll call.

For example, for an inter-LATA call, the CO 11 might route the call to the point of presence (POP) 31 of the inter-exchange carrier (IXC) network 33, if subscriber had previously picked that carrier for inter-LATA services. The CO supplies the dialed destination number to the billing system or other toll network, which proceeds to complete the call processing and billing in the normal automated manner.

Conversely, for a toll call that the subscriber's selection indicates should be handled by the local exchange carrier network, the switch in the CO 11 initiates routing through the network. The network switching offices 11 route the call to the operator switch 25 and pass-on the 0+ destination number information. At the operator switch 25, the call arrives at the operator switch 25 as a 0+ call with the destination digits included in the accompanying signaling message(s). The switch 25 therefore routes the call to one of the automated processing systems 27 designated for handling of automated billing services, for example to an AABS system or the like. Essentially, the platform 21 converted the 0– call to a 0+ call, and the network routed the call to the appropriate billing resource 27 and provided the necessary information to that resource to facilitate automated processing.

A third prompt in the menu might offer the caller the option of directory assistance. If the caller requesting operator services desires directory assistance, the caller would input a selection thereof, typically after hearing the directory assistance prompt. Upon receipt of this selection, the front-end platform 21 would inform the control resource 19, and the method converts the call to a directory assistance call, by changing the nature of number to national dialing plan and supplying normal digits for a directory assistance call, e.g. 411 in an instruction to one of the COs 11. In response the CO 11 routes the call through the network to the operator switch 25 as a directory assistance call to 411.

When such a call reaches the operator switch 25, that switch routes the call specifically to a resource for directory assistance. For example, if one of the automated systems 27 is an automated directory assistance system, the switch 25 routes the call to that system 27. If there is no automated system available to handle the directory assistance service, the switch 25 routes the call to an operator position of a type designated for the directory assistance service.

Another prompt in the menu may offer one of several other common destinations 43. The caller may want to talk to the business office of the local carrier, for example to discuss service or feature subscriptions, billing questions and the like. As another example, the caller may need to ask for repair service. If the caller selects one of these other destination options in response to the menu prompts, the platform 21 converts the call to a direct dialed call. The platform 21 provides an instruction to the CO 11 containing the destination number for the option selected by the caller and indicating national dialing plan as the nature of number. The CO 11 then initiates routing of the call through the network to the appropriate destination 43, as if the caller had originally dialed the number for that destination.

For calls routed to the PSAP, the business office or the repair service, the call need not ever go through the operator switch 25. Consequently, such calls do not tie up switch or trunk resources, as would be the case if such calls went to a call completion operator, under the older 0– procedures.

One or more of the menu options may relate to a service still provided by the call completion operator. Also, situations will arise when the menu and selection process is unsuccessful, because of an error or a deliberate choice to opt out of the menu by the caller. In any of these situations, the control resource 19 and front-end platform 21 still process the call; but in such a manner as to direct the call to a live operator. The CO 11 receives an instruction to resume or continue call processing based on the original operator request, and the nature of number remains operator requested—no digits present. The CO 11 therefore routes the call to the operator switch 25, and that switch routes the call to an appropriate operator position 29, exactly in the manner done today.

Those skilled in the art will recognize that the menu of options and the types of resultant calls can be expanded to include further options commonly requested of operators. Several additional examples will be discussed later, with regard to a preferred embodiment.

The enhanced call processing responsive to operator service requests may be implemented in a variety of different types of physical networks. The preferred embodiments utilize various implementations of modern telephone networks. To understand the invention, it may be helpful to now consider the architecture and operation of an advanced intelligent network (AIN) type implementation of a public switched telephone network.

Figure 2:
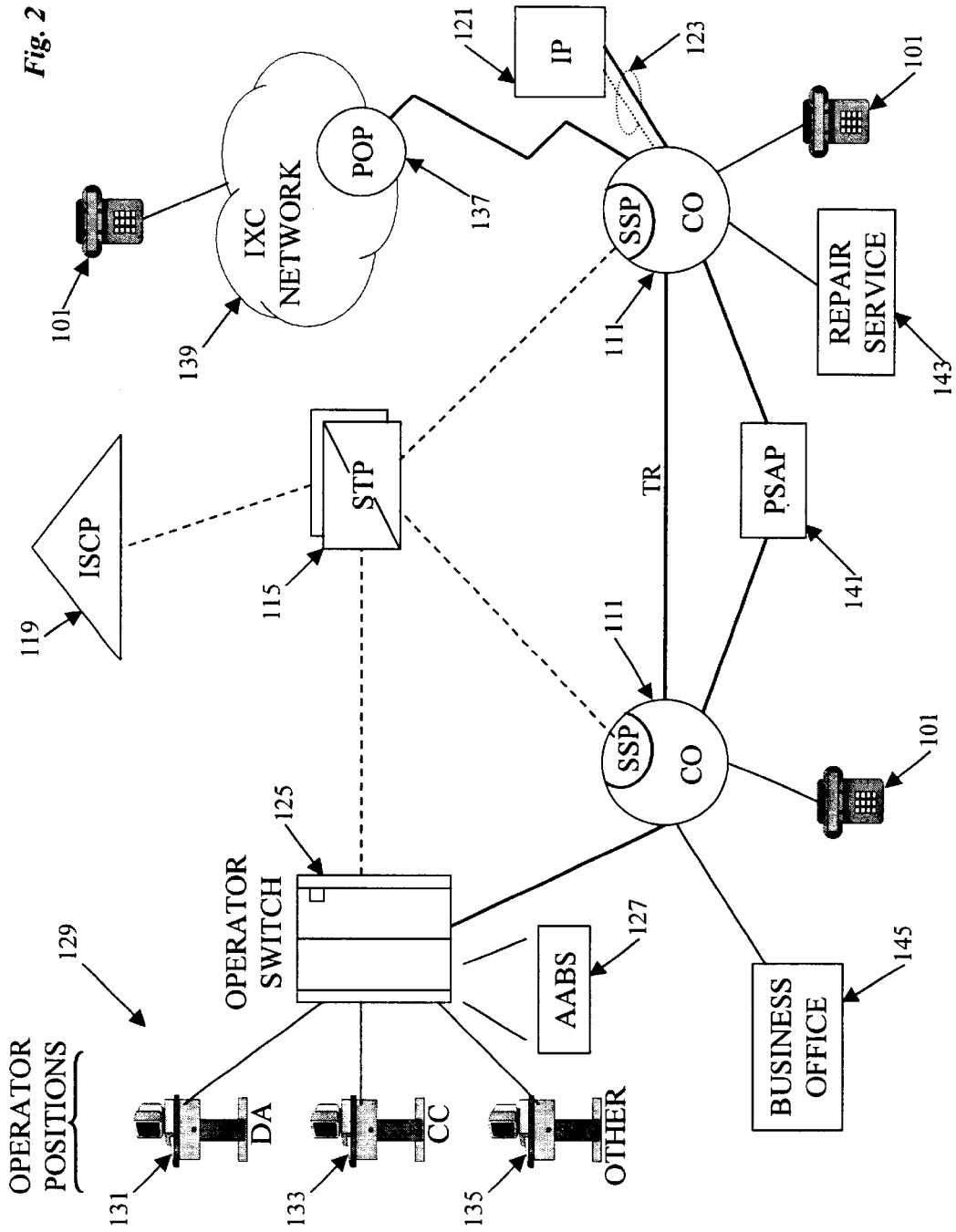
FIG. 2 is a functional block diagram of the preferred intelligent network implementation used for the present invention.

FIG. 2 provides a simplified illustration of the preferred intelligent telephone network for implementing the automated operator service call handling in accord with the present invention. As shown in that drawing, the telephone network includes a switched traffic network and a common channel signaling network carrying the control signaling messages for the switched telephone traffic network.

In this implementation, the telephone or traffic network (operated for example by a local carrier) includes a number of end office and/or tandem office type central office switching systems (COs) 111. FIG. 2 shows a number of subscriber stations, depicted as telephones 101, connected to a two exemplary central office switches 111. In the preferred implementation, the connections to the end office CO switches 111 utilize telephone lines, and the switches are telephone type switches for providing landline communication. However, it should be recognized that other communication links and other types of switches could be used. Trunk circuits TR carry communication traffic between the central office switches 111. Each end office type CO switch 111 provides switched telephone connections to and from local communication lines or other subscriber links coupled to end users stations or telephone sets 101. Although shown as telephones in FIG. 2, the terminal devices or stations 101 can comprise any communication device compatible with the local communication link. Where the link is a standard voice grade telephone line, for example, the terminals could include facsimile devices, modems, etc. However, for operator service calls processed by the invention, callers typically utilize standard telephone stations.

The lines and trunks through the central offices 111 carry the communication traffic of the telephone network, including the calls initiated by an explicit request for operator service and calls redirected in accord with the inventive call processing. The preferred telephone network, however, also includes an interoffice signaling network carrying a variety of signaling messages, principally relating to control of processing of calls through the traffic portion of the network. This network carries signaling between switches in the COs 111 as well as signaling to other nodes. As discussed more later, this network transports certain messages to and from the preferred form of the control resource as well as certain signaling intended for or initiated by the preferred front-end platform.

The signaling network includes packet data links (shown as dotted lines) connected to appropriately equipped central office switching systems such as offices 111 and a plurality of packet switches, termed Signaling Transfer Points (STPs) 115. To provide redundancy and thus a high degree of reliability, the STPs 115 typically are implemented as mated pairs of STPs. The signaling network of the telephone system operates in accord with an accepted signaling protocol standard, preferably Signaling System 7 (SS7).

In the preferred embodiment shown in FIG. 2, each central office 111 has at least minimal SS7 signaling capability, which is conventionally referred to as a signaling point (SP) in reference to the SS7 network. As such, the offices can exchanges messages relating to call set-up and teardown, typically in ISDN-UP format. At least some, and preferably all, of the central office switches 111 are programmed to recognize identified events as advanced intelligent network (AIN) type service triggers at predetermined points in call (PICs). In response to a trigger at a PIC, a central office 111 initiates a query through the CCIS signaling network to either a control node such as a Service Control Point (SCP) or to a database system, such as a Line Identification Database (not shown). For purposes of discussion here, the queries are directed to an SCP, for example an element within the Integrated Services Control Point 119 that serves as the centralized implementation of the control resource. The SCP provides instructions relating to AIN type services, in this case, for the inventive handling of operator service calls. Those central office switching systems having full AIN trigger and query capability for communication with the SCP and/or the LIDB are referred to as Service Switching Points (SSPs).

The CO switches 111 typically consist of programmable digital switches with SSP communications capabilities. One example of such a switch is a 5ESS type switch manufactured by Lucent Technologies; but other vendors, such as Northern Telecom and Seimens, manufacture comparable digital switches which could serve as the SSPs. The above described data signaling network between the SSP type central offices 111 and the ISCP 119 is preferred, but other signaling networks could be used.

The integrated system of the ISCP 119 includes a Service Management System (SMS), a Data and Reporting System (DRS) and the actual database also referred to as the Service Control Point (SCP). In this implementation, the SCP maintains a Multi-Services Application Platform (MSAP) database which contains call processing records (CPRs) for processing of calls to and from various subscribers. The ISCP 119 also typically includes a terminal subsystem referred to as a Service Creation Environment or SCE for programming the MSAP database in the SCP for the services subscribed to by each individual customer. The components of the ISCP 119 are connected by an internal, high-speed data network, such as a token ring network. The internal data network also typically connects to a number of interfaces for communication with external data systems, e.g. for provisioning and maintenance.

The SCP or other form of centralized control resource may be implemented in a variety of other ways. The SCP may be a general purpose computer running a database application and/or may be associated with one of the switches. Another alternative is to implement a database of CPRs or the like within an STP (see e.g. Farris et al. U.S. Pat. No. 5,586,177).

The preferred telephone network also includes one or more intelligent peripherals (IPs) 121, each of which serves as a front-end platform, to provide enhanced announcement and caller-input collection capabilities. Preferably, the IP 121 collects dialed-digit inputs and performs speech recognition on spoken selections, for the automated processing of operator service calls in accord with the invention. The IP 121 may be essentially similar to that disclosed in commonly assigned U.S. Pat. No. 5,572,583 to Wheeler, Jr. et al. entitled "Advanced Intelligent Network with Intelligent Peripherals Interfaced to the Integrated Services Control Point," and the disclosures of the switches, the ISCP, and the network as well as the disclosure of the structure and operation of the IP from that Patent are incorporated herein in their entirety by reference.

The IP 121 may connect to one or more central offices 111, although only one connection is shown for convenience. The connections transport both communication traffic and signaling. The connection between a central office (CO) 111 and the IP 121 may use a combination of a T1 and a Simplified Message Desk Interface (SMDI) link, but preferably this connection utilizes a primary rate interface (PRI) type ISDN link 123. Each such connection provides digital transport for a number of two-way voice grade type telephone communications in the B-channels on the PRI. The connection also provides a D-channel transporting signaling data messages in both directions between the CO switch 111 and the IP 121.

As discussed more later, there are certain circumstances in which the ISCP 119 communicates with the IP 121. These communications could utilize a separate second signaling network and either an 1129+ protocol or a generic data interface. (GDI) protocol, as discussed in the above incorporated Patent to Wheeler, Jr. et al. However, in the presently preferred embodiment of FIG. 2, the IP 121 and the SCP 119 communicate with each other via an 1129 protocol. Between the SSP 111 and the ISCP 119, the 1129 protocol messages are transported via the SS7 network, e.g. through one or more of the STPs 115 in SS7 protocol packets. Between the SSP 111 and the IP 121, the 1129 protocol messages are transported via the D-channel of the PRI link 123.

The IP 121 can provide a wide range of call processing functions, such as message playback and digit collection. In the preferred system, the IP 121 also performs speech recognition. Consequently, the subscriber may input the necessary information to select an option from the menu offered and to input any additional information needed for a selected option, either as dialed DTMF digits, or as speech for recognition on the IP-type front-end platform. The IP 121 preferably provides Speaker Independent Speech Recognition (SIR) at least for recognition of: digits 1–9, zero, "oh", "yes", "no", "cancel", "Card", "Collect", "Third", "Operator" and other simple commands. The system also is capable of ignoring extraneous speech, such as, "er", "um", etc. Active grammar of recognition supports continuous digit recognition of strings of up to 18 digits, acceptance of or non-acceptance of a call, certain phrases relating to special types of call billing such as credit card or third party, as well as statements of certain carrier service destinations such as "business office" or "repair". The recognition capability will detect requests for "directory assistance" and will identify a spoken request for an "operator" in the event the caller desires a live operator conversation. The speech recognition technology may also offer phonetic based speaker independent recognition to support a large vocabulary for other applications. The IP platform 121 also preferably provides announcements in multiple languages.

The preferred embodiment utilizes the Intelligent Peripheral (IP) 121, as the front-end processing platform for playing announcements and collecting input information. For purposes of practical implementation of the invention, however, the IP is simply a resource capable of providing the desired messaging and input collection functions. A variety of other platforms could serve these functions. As noted earlier, the invention could utilize announcement platforms in one or more of the SSP type COs 111. Other alternatives are discussed later. The advantage of the IP 121, particularly over a switch-based approach, is that it provides a single centralized platform for the service, which can be readily maintained and updated over time without the need to install new software, announcements or equipment in large numbers of COs.

With the appropriate trunking to one or more of the COs 111, one IP 121 is accessible to provide service for virtually any telephone customer in the LEC's network. In a practical implementation serving a large geographic area, there would typically be several pairs of IPs 121, to provide adequate resources to meet the levels of expected traffic demand and to provide a certain degree of redundancy. If the particular CO 111 receiving an operator service call is not directly connected to the IP 121, it can route the call through one or more of the other COs 111 to reach the link 123 to the IP 121.

The network of FIG. 2 also includes an operator switch 125. The switch 125 connects through trunk circuits to one or more of the central offices 111. The operator switch 125 also has SS7 signaling capabilities and connects through one or more SS7 signaling links to the STPs 115.

The network also includes a system for automated alternate billing service (AABS) 127. The platform serving as the AABS system 127 may be a separate platform, for example another IP or implemented as a functionality of the same IP 121 providing the front-end processing for 0– calls. In the illustrated embodiment, the AABS system 127 is a platform connected to or built into the operator services switch 125.

For actual operator services, the operator switch 125 distributes incoming calls to operator positions shown collectively at 129. In accord with the invention, one operator switch 125 selectively directs incoming calls to specially trained and equipped operators. For example, the operator at position 131 may provide directory assistance (DA); and the data equipment at that station provides access to directory assistance databases covering a wide geographic service area. The operator at position 133 may serve as a call completion (CC) operator and provide general (default) operator assistance. Another operator position 135 may provide other types of services, for example to handle alternate billing services such as credit card calls or collect calls when or if they require a live operator. As discussed more later, the routing of the calls after front-end processing by the IP 121 provides sufficient data to the operator switch 125 to distribute calls appropriately among the AABS system 127 and the different types of operators at the stations 131, 133 and 135.

Each operator position is essentially a workstation having a telephone and processor terminal. A local area network (not shown) interconnects the plurality of operator positions and provides data communications for the terminal interface portions thereof. Through this communication, for example, a directory assistance operator position 131 has access to one or more directory listing databases.

The operator switch 125 is a programmed control type telephone switch that is set up specifically to provide a variety of operator services. In the preferred embodiments, the operator switch 125 may be a Traffic Operator Position System (TOPS) manufactured by Northern Telecom or an Operator Services Position System (OSPS), which is manufactured by Lucent Technologies, or equivalents thereof. The operator switch 125 provides call distribution to the operator positions. The switch provides switched two-way voice communications between the operator positions 129 and voice circuits of any trunks or lines on which calls are received from the offices 111. The switch 125 has the capability for routing calls to terminals 129 serving other operator functions and to the AABS system 127.

The operator switch 125 also provides switched connections of calls received on the incoming trunks to trunks and/or lines of the public switched telephone network. These outgoing connections allow the switch 125 to provide complete call connections to destination stations, for example identified by retrieved directory listing information or after appropriate special billing operations. Some completions may require routing to another network, such as the IXC network 139.

The operator services switch 125 preferably has SS7 signaling capability. In the embodiment of FIG. 2, the switch 125 has an SS7 link to a pair of STPs 115 just like a CO 111. The inventive call processing, however, is equally applicable to networks still using older operator switches with only in-band signaling.

As noted earlier, AIN call processing involves a query and response procedure between an SSP capable central office 111 and a control resource system, such as the SCP database in the ISCP 119. The SSP capable switching offices 11 initiate such processing upon detection of triggering events at appropriate points during processing of telephone calls. AIN call processing can utilize a variety of different types of triggers to cause the SSPs 111 to initiate the query and response signaling procedures with the ISCP 119.

The processing of different calls by the switch of a CO 111 will hit different types of triggers at different points in call (PIC). For example, the switch processing may hit an off-hook delay type trigger set against a particular line at a "digits collected" point in call. In accord with one aspect of the invention, the central offices 111 have a trigger based upon detection of an operator service request. For the preferred embodiments of the automated operator services call processing, the central office switch processing will hit some form of 0– trigger, set for all lines serviced through the respective end office, at an "info analyze" point in call. The trigger is set at that point in call in the first switch to receive a call, typically the serving end office.

The trigger may be a specific operator services trigger developed specifically for recognition of the 0– type dialing pattern, for example based on detection of a dialed 0– digit followed by a delay longer than the inter-digit timing period used by the switch. Alternatively, the switch may use a modified form of a variable dialing string trigger. For some time, the AfN capable SSPs have used a 3/6/10 trigger to recognize the dialing of specific 3-digit, 6-digit and 10-digit numbers. For some switches, the 3/6/10 trigger has been converted to a variable digit string trigger, which recognizes the dialing of any variable string. Using this variable trigger, the carrier can program the switch to recognize the dialing of a single digit of a specific value, in this case a 0 only.

There will be some circumstances where the CO 111 will have other triggers that may effect the call. One example is where the call would trigger processing in relation to a competitive local exchange carrier (CLEC), either by a trigger set against the specific CLEC customer's line or more often by an off-hook delay trigger set against all lines in an office serving one or more CLEC resale customers' lines. In such cases, the CLEC related trigger would take precedence and result in querying the ISCP on all outgoing calls from the effected lines. The programming in the ISCP 119 would determine how to route the call in all cases, including 0– calls. For example, for at least those customers still paying for service from the LEC, the ISCP 119 would instruct the CO 111 to route the calls to the IP 121 for front-end processing in accord with the invention. For customers of the CLEC, the programming required by the CLEC would control. For example, if a CLEC customer dialed 0–, the CLEC call processing record in the ISCP 119 would cause the CO 111 to route the call to an operator services location designated by the CLEC and would typically bypass the front-end menu operation that the invention might provide for the customers of the LEC.

The triggering on 0– calls could utilize an off-hook__ delay type trigger. The ISCP 119 would detect whether or not each call was an operator services call. Use of that type of trigger requires setting the trigger against all lines on the effected SSP COs 111. Also, that approach would result in an inordinate amount of query and response traffic to and from the ISCP 119, including signaling for many calls that would hit the trigger but would be otherwise normal dialed calls. Hence, the preferred approach utilizes a trigger for detecting a single digit dialing pattern, where the single digit recognized is a 0, as outlined above.

The SSP type central offices (COs) 111 have the trigger capability, and the trigger is set for 0– dialing in those COs to implement the present operator services call processing routine. To enable appropriate responses to triggered queries, the SCP in the ISCP platform 119 also must be programmed to recognize the identification of the particular trigger used to implement the service. In this case, the ISCP 119 is programmed to recognize and respond to query messages indicating the particular type of triggering responsive to a 0– dialing pattern.

The preferred embodiment makes use of certain processing based on the "nature of number" parameter. The call processing uses the following nature of number values: no digits present operator request (sometimes referred to as operator request—no digits), national number operator request, and national number plan.

When a CO 111 receives a call, and hits a triggering point in call processing, the processor in the switch formulates a query message to send to the ISCP 119. The processor populates certain information fields in the query message with data about the call, such as the automatic line identification about the calling party and any digits that the caller has dialed so far in the call processing. The processor in the switch uses a prefix digit interpreter table or "PDIT" table to populate other parameters into the appropriate fields of the message. For example, the processor uses this table to populate the nature of number field with the parameter appropriate to the particular call.

For 0– or any other operator request calls, the PDIT table will cause the switch processor to insert characters into the query message indicating that the nature of number is an operator request with no digits present. When there is a no digits present type operator request identified as the nature of number, the ISCP assumes that there are no digits dialed included within the query message or that any digits included in the dialed digit field are irrelevant. In such a case, the ISCP 119 will essentially ignore any telephone numbers or dialed digits included in other fields of the query message. The ISCP 119 instead responds by directly identifying the CPR used for operator service requests. As discussed more later, the ISCP 119 will convert the value to another value, such as national number plan or operator request—national number, as part of its processing of specific types of calls.

It may be helpful now to begin discussing the AIN call processing of operator service calls in accord with the invention.

Assume initially that the announcements are implemented in the announcement platform in the switch. When the caller requests operator services, the CO 111 suspends call. processing and queries the ISCP 119. The ISCP 119 identifies and retrieves an appropriate CPR from its internal SCP database, in this case a CPR associated with the 0– services application. Using that CPR, the ISCP 119 formulates a 'play announcement and collect' digits type TCAP instruction. The instruction identifies the announcement, in this case for the operator services menu, and the instruction specifies the number of digits expected, in this one. The ISCP 119 sends the instruction back to the SSP CO 111 via one or more of the STPs 15. The CO 111 plays the operator services front-end menu announcement and waits to collect a digit. When a digit is received in the switch, the CO 111 then forwards the selection digit to the ISCP 119 in another TCAP message, and the ISCP analyzes that digit to determine how to proceed. In some cases, the ISCP may instruct the switch to play a further announcement and collect additional digits, for example to request and receive a destination number.

When the ISCP 119 has enough information, it sends back an appropriate instruction to the SSP type CO 111. The instruction will include a nature of number parameter, and in many cases for the operator services call processing, this parameter value will have changed.

In some situations, the instructions cause the CO switches 111 to route the call to the operator switch 125. The routing to the operator switch 125, however, will serve to direct to specific resources, such as the AABS system 127, a directory assistance operator position 131, a call completion (CC) operator position 133 or some other specialized operator position 135. In many of these cases, there is a national number operator request value in the nature of number field, and the messaging will include three or ten digits relating to the operator services request, for example to identify a destination (e.g. for alternate billing). A CO 111 receiving such a final instruction will route the call using its normal 0+ procedures and include the same nature of number parameter and destination digits in any subsequent signaling relating to the call. The routing may go to the switch 125 if the carrier operating that switch provides the particular service, or the call may go to the POP 137 of another carrier's network 139, if an alternate carrier provides the service for the calling line.

Also, if the caller selected directory assistance, the final instruction to the CO 111 indicates that the nature of number is national number plan, and the message includes the digits 411 in the destination number field. Essentially, this is an instruction to route a call as if the caller had actually dialed the 411 digits, which the national number plan defines as a 3-digit request for directory assistance.

The actual routing may go directly to certain selected destinations, such as the emergency services PSAP 141, the center 143 handling the network repair service or the carrier's business office 145. For 911 service, the final instruction to the CO 111 indicates that the nature of number is national number plan, and the message includes the digits 911 in the destination number field. Essentially, this is an instruction to route a call as if the caller had actually dialed the 911 digits, which the national number plan defines as an emergency number. For other destinations such as 143 and 145, the final instruction to the CO 111 indicates that the nature of number is national number plan, and the message includes the digits of the particular location 143 or 145 in the destination number-field. Essentially, this is an instruction to route a call as if the caller had actually dialed the seven-digit or ten-digit number of the particular destination.

The preferred embodiment, utilizing the IP 121 as the front-end platform operates in a similar manner. To insure full understanding of the inventive operations, it may be helpful to discuss operations in that embodiment in some detail and then consider several specific call processing examples. In operation, assume a caller at a first station 101 dials the 0 and waits without further immediate input. The CO 111 detects the off-hook station and the dialed 0, and the call processing proceeds to hit the trigger, effectively recognizing the call as an operator service request. The CO 111 suspends call processing at the Info__Analyzed Point-in-Call (PIC), essentially upon recognition that it must obtain further information or instructions from a remote control resource, in this embodiment the ISCP 119. The CO 111 will utilize its SSP signaling capabilities to formulate an Info__ Analyzed type query in the Transaction Capabilities Applications Part (TCAP) protocol and send that query through one or more of the STPs 115 to the ISCP 119.

Along with other information, the query includes an identification of the triggering 30 event, in this case the 0– dialing pattern. In the query to the ISCP the value in the nature of number field indicates a no digits present type operator request. At this point in the procedure, the ISCP 119 recognizes the 0– type trigger and attendant nature of number, and the SCP retrieves an appropriate CPR to control the processing of the operator services request.

Using the CPR, the ISCP 119 determines the next step in call processing and formulates an appropriate response message to send back to the central office. In this case, the intent is to route the 0– call to the IP 121 that provides the front-end services for such calls in the area from which the call originated. The ISCP 11 9 formulates a Send_to_ Resource type response in the TCAP protocol. The message contains a routing number associated with the IP 121. The ISCP 119 sends that response message through the STPs 115 back to the originating end office CO 111. In response, the end office 111 routes the call to the IP 121. As part of this routing, the SSP type CO 111 provides an 1129 protocol message over the D-channel of the ISDN PRI link 123 to the IP 121 instructing the IP to initiate the menu and selection input procedure for operator service calls.

The IP 121 goes through a series of menu prompts and collects any inputs from the caller. If the caller inputs a digit corresponding to a menu selection, the IP 121 suspends the menu playback and supplies a digit over the D-channel of the ISDN PRI link 123 to the SSP type CO 111.

The SSP CO 111 formulates a Call_Info_From_ Resource type message in the Transaction Capabilities Applications Part (TCAP) protocol and sends that query through the STPs 115 to the ISCP 119. Along with other information, this message identifies the digit input from the caller. The ISCP 119 uses the CPR to analyze the digit input and identify the desired service. The ISCP in some cases instructs the IP to give a further prompt and collect further input information from the caller, typically the destination number for an alternate billing call. The ISCP 119 formulates and sends back a response message instructing the SSP CO 111 to process the call. The precise instruction will vary somewhat depending on the selection made by the caller.

When the ISCP 119 determines how to route a call, and formulates the appropriate instruction, it includes the appropriate parameter value in the nature of number field. In many cases for the operator services call processing, this parameter value will have changed from the original operator request—no digits present value provided by the trigger-detecting CO 111. For example, in instructions to route calls as 0+ call, the parameter field in the instruction will indicate "operator request—national number" as the nature of number.

The CO 111 will receive the final value for the nature of number and either will have or receive from the ISCP 119 digits to use for the necessary routing. The CO 111 then resumes normal call processing and routes the call based on the nature of number and the available digits.

FIGS. 3 through 7 show specific examples of the signal flows involved in the various option selections, in accord with a preferred embodiment. Each call flow is discussed in detail below. The order of the options in the menu and the digits used to select particular options are purely exemplary.

Figure 3:
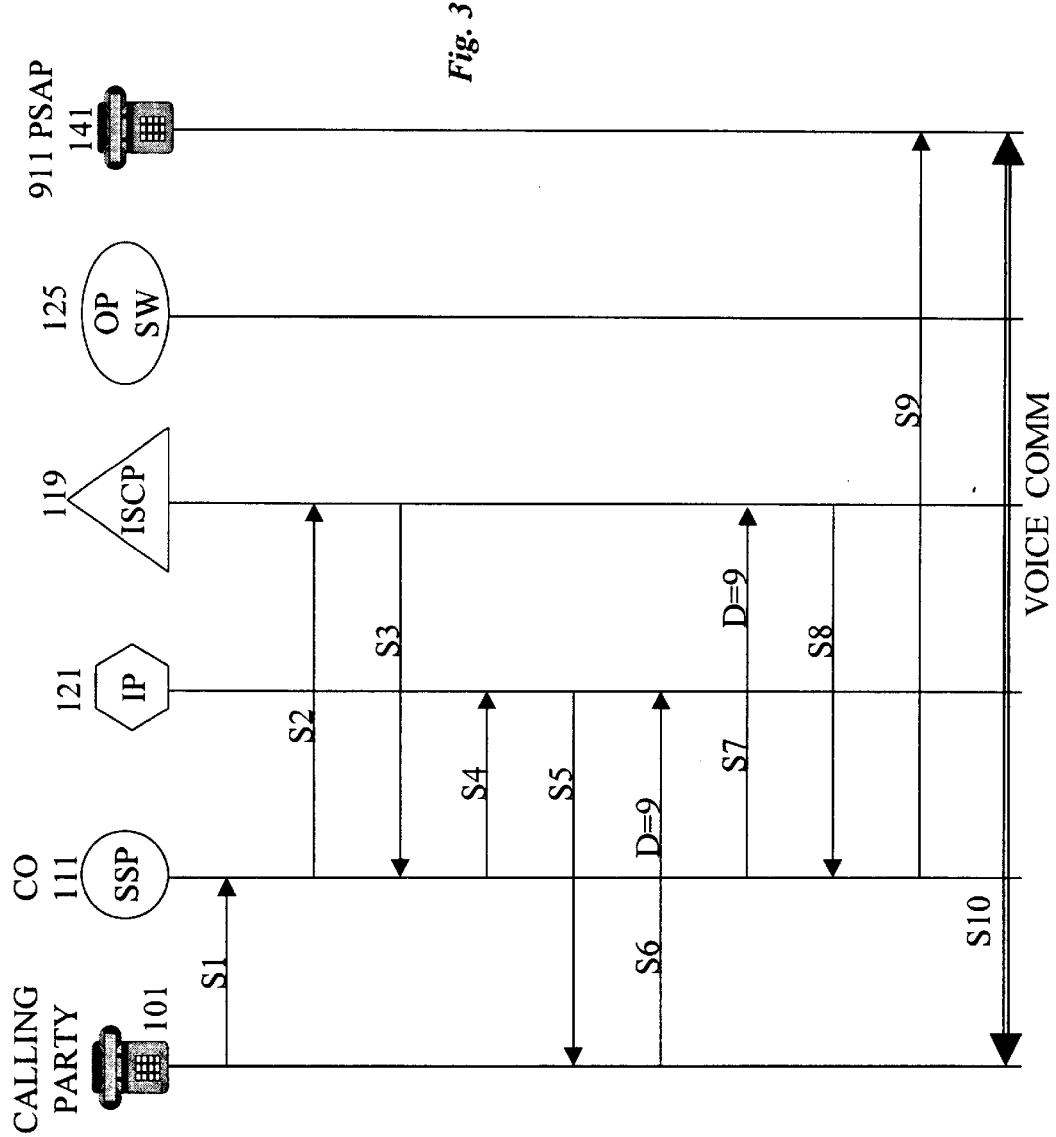
FIG. 3 is a signal flow diagram useful in explaining the flow of call processing for an emergency request.

Consider first the scenario represented by FIG. 3. At step S1, the caller at a station 101 dials the 0 without more digits. The serving end office type CO 111 detects the call and receives the 0 digit dialed. As a result, processing in the end office 111 hits the trigger set to recognize the 0– dialing pattern. At step S2, that CO 111 suspends call processing at the Info_Analyzed Point-in-Call (PIC). The SSP CO 111 formulates an Info_Analyzed type query in the TCAP protocol and sends that query through the STPs 115 to the ISCP 119. Along with other information, the query includes an identification of the triggering event, in this case the 0– dialing pattern and the operator request—no digits present type nature of number.

The ISCP recognizes the 0– type trigger, retrieves the appropriate CPR and formulates a response. At this point, the ISCP 119 formulates a Send_to_Resources type response message containing a routing number associated with the IP 121. In step S3, the ISCP 119 sends that response message through the STPs 115 (shown in FIG. 2) back to the originating end office CO 111. In response, the end office 111 routes the call to the IP 121 (step S4). In response to the call and the associated 1129 protocol signaling, the IP 121 plays the initial greeting to the caller at station 101 and starts through menu announcement (step S5).

In this example, the caller desiring to make an emergency call hears the menu prompt relating to emergency service and speaks or dials a 9 digit, which the IP 121 receives (step S6). The '9' is used for emergency calls because it is readily detectable even if input from a rotary phone (appears as 9 pulses). The IP 121 supplies the dialed digit, in this case a 9, to the SSP type CO 111 (step not separately shown). In step S7, the SSP CO 111 formulates a Call_Info_From_ Resource message and sends that message to the ISCP 119.

The ISCP recognizes from the number 9 as the selection digit in the message that the caller requested a 911 call. The ISCP 119 therefore formulates an Analyze-Route type response message containing a 911 routing number and identifying the national number plan as the nature of number. It should be noted that the ISCP 119 has converted the nature of number parameter from operator request—no digits as in the original query to national number plan. In step S8, the ISCP 119 sends that response message through one or more of the STPs 115 back to the end office CO 111.

The change in the nature of number plan is necessary to insure that the SSP type CO 111 will now act on the digits contained in the instruction. If the nature of number remained operator request—no digits present, the CO would treat the call as an operator services call and route the call through the switch 125 to a call completion (CC) type operator position 133. However, because the nature of number parameter is national numbering plan, the SSP type CO 111 will route the call based on the digits provided in the Analyze_Route type response message from the ISCP 119, in this case based on the 911 digits.

Upon receipt of the last message, the end office CO 111 therefore releases the connection to the IP 121 and routes the call as if the caller had originally dialed the digits 911 (step S9). The normal 911 routing procedure of the CO 111 causes it to directly connect the call to the 911 PSAP 141 and to supply line identification information to the PSAP equipment. Voice communication then ensues between the 911 caller and emergency response personnel at the PSAP 141 (step S10). The end office CO 111 also sends a Resource_ Clear message through the CCS network to the ISCP 119, to indicate the release of the connection to the IP 121.

As shown by the detailed example of FIG. 3, the 911 call did not need to go to an operator or even go through the operator switch 125. As a result, no activity of a telephone network operator was required, and the 911 call did not tie-up any trunks or any resources within the operator switch.

Figure 4:
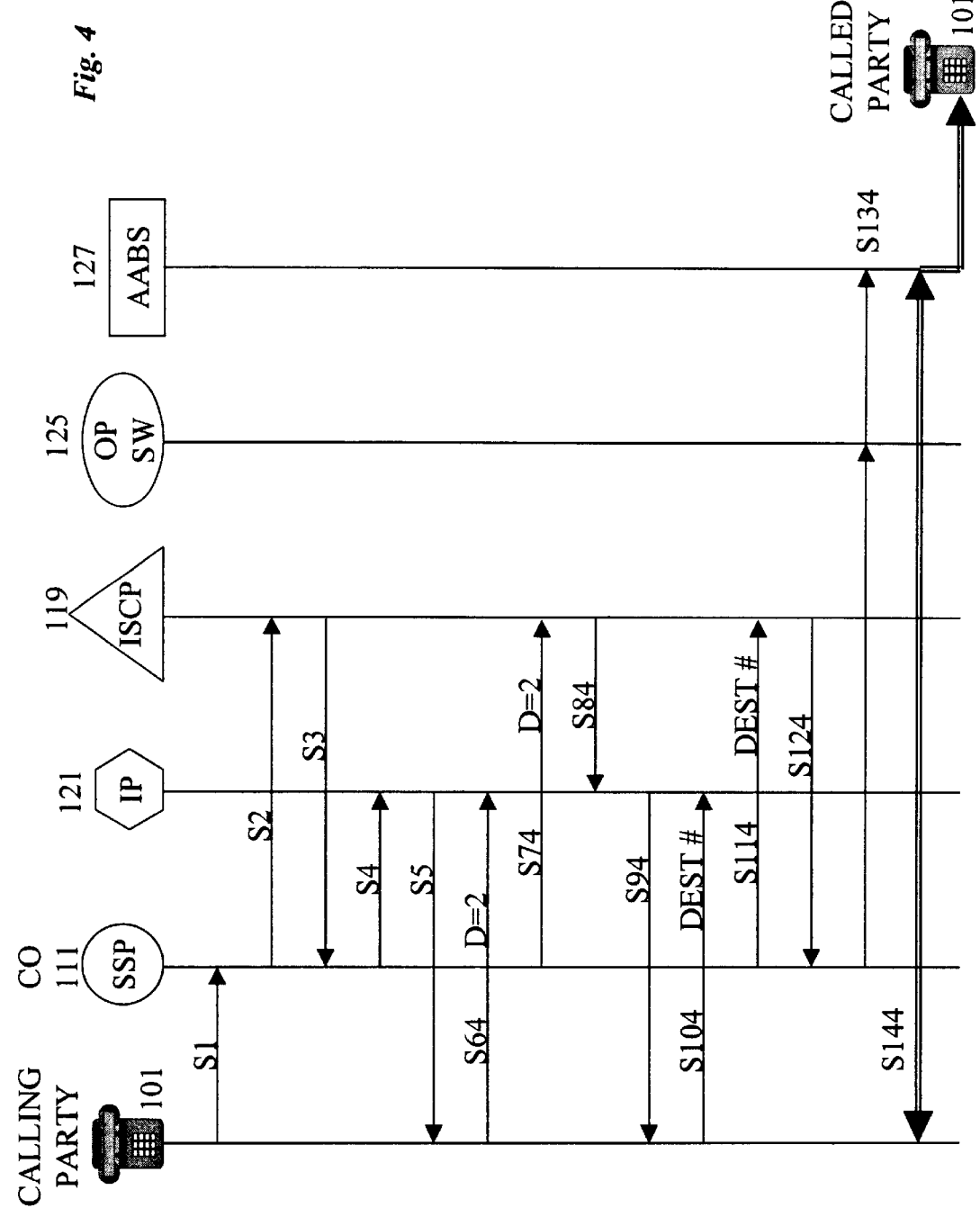
FIG. 4 is a signal flow diagram useful in explaining the flow of call processing for a request for alternate billing service on a toll call.

Consider next the alternate billing scenario of FIG. 4 as another example of the inventive call processing. Like steps are indicated by similar reference numerals. Again, at step S1, the caller dials the 0 without more digits, and the serving end office type CO 111 detects the call and receives the 0 digit dialed. When the end office 111 hits the 0– trigger, that CO suspends call processing at the Info_Analyzed PIC. The SSP CO 111 formulates an Info_Analyzed type query and sends that query through the STPs 115 to the ISCP 119 (step S2).

Again, the ISCP 119 retrieves the appropriate CPR and returns a Send_to_Resource type response message containing the routing number associated with the IP 121 (step S3). Upon receiving that response, the end office 111 routes the call to the IP 121 (step S4). In response to the call and the associated signaling, the IP 121 plays the initial greeting to the caller and starts through menu announcement (step S5). To this point, the call processing is exactly the same as in the previous example.

In this example, however, the caller desiring to make an alternate billing type call does not respond to the 911 prompt at the beginning of the menu. Instead, the caller waits and hears the second prompt relating to collect call, bill to third party and calling card type alternate billing services. This prompt asks the caller to input a 2 if this is the desired service. When the caller hears the alternate billing portion of the menu, the caller speaks or dials a digit, in this case the digit 2, which the IP 121 receives (step S64). The IP 121 supplies the dialed digit 2 to the SSP type CO 111, and in step S74, the SSP CO 111 formulates a Call_Info_From_Resource message and sends that message to the ISCP 119. In this case the dialed digit identified in this latest message is the 2 input by the caller desiring the alternate billing service.

The ISCP analyzes the input digit, and in this case recognizes the 2 as a request for an alternate billing option. In step S84, the ISCP sends an 1129 protocol message back through one or more of the STPs 115 and then the CO 111 to the IP 121, instructing the IP to play another announcement to the caller at station 101 and collect digits. In step S94, the IP 121 plays the announcement prompting the caller to input the destination telephone number. Upon hearing this announcement, the caller at station 101 dials-in or speaks-in the NPA-NXX-XXXX digits of the destination telephone number (step S104). The IP 121 forwards the input digits to the SSP (step not separately shown), and the SSP of CO 111 transmits a Call_Info_From_Resource message containing the destination number through one or more of the STPs 115 to the ISCP 119 (step S114).

The ISCP 119 formulates an Analyze_Route type response message and sends that message back to the. SSP CO 111. In step S124, the ISCP 119 sends that response message through one or more of the STPs 115 back to the end office CO 111. For a call in which the user selected the option for a credit card call, a bill to third party call or a collect call, the ISCP changes the nature of number to indicate national number operator request and includes that value for the nature of number parameter in the Analyze_Route type response message. The message also includes the ten-digit destination number dialed by the caller and originally received by the IP 121. As a result, the SSP type CO 111 routes the call as if the caller had originally dialed 0+ the ten-digit destination number.

For example, the processor of the switch in the CO 111 examines the identification of the calling line and the destination number and determines the type of call (local call, intra-ATA or inter-LATA). Then the processor identifies the subscriber's preferred carrier for that type of toll call. For example, if the call is local or the call is an intra-LATA toll call and the subscriber has picked the local exchange carrier for that type of toll call service, the CO 111 routes the call to the operator switch 125. Typically, such calls will initially go to an automated system, such as the AABS 127. If no automated system is available or the automated processing can not complete the call, the switch 125 will direct the call to an operator position 135. If the call is an inter-LATA toll call, the CO 111 routes the call to the point of presence (POP) 137 for the IXC network 139 of the carrier that the subscriber has picked for that type of toll call service. The signaling with the call will identify the call as a 0+ call, and in many cases, the POP 137 will route the call to AABS equipment within the IXC network 139 for automated handling.

In the specific example illustrated in FIG. 4, upon receipt of the Analyze_Route type response message, the end office 111 releases the connection to the IP 121 and routes the call as if the caller had dialed 0+ the NPA-NXX-XXXX digits of the destination telephone number (step S134). In this example, assume an intra-LATA destination and that the LEC operating the switch 125 and the AABS system 127 is the customer-selected carrier for the intra-LATA toll service. The CO 111 therefore processes the call to the operator switch 125 as if the caller had originally dialed the 0+ the NPA-NXX-XXXX digits of the destination number. The network supplies the dialed digits as well as the identification of the line of the calling station switch 101 to the switch 125, and the switch route the call to the AABS system 127 (step S134).

An interactive communication now ensues between the calling station 101 and the AABS system (step S144), which typically results in a completed call to the called station 101. This communication follows the standard AABS procedures and results in the desired form of automated billing by that system, for example collect, bill to third party or bill to credit card or calling card number.

As shown by the detailed example of FIG. 4, the alternative billing call need not go to an operator, even though the caller dialed 0– instead of 0+. The inventive processing essentially converts the 0– call to a 0+ call without live-operator intervention. The call is routed to automated equipment for handling the alternative billing function, and the network in fact can route the call to the equipment of the subscriber's carrier of choice. If the toll call is intended for a carrier other than the one operating the switch 125, for example, the call goes to that carrier's point of presence 137 without tying up trunks to or resources in the switch 125.

Figure 5:
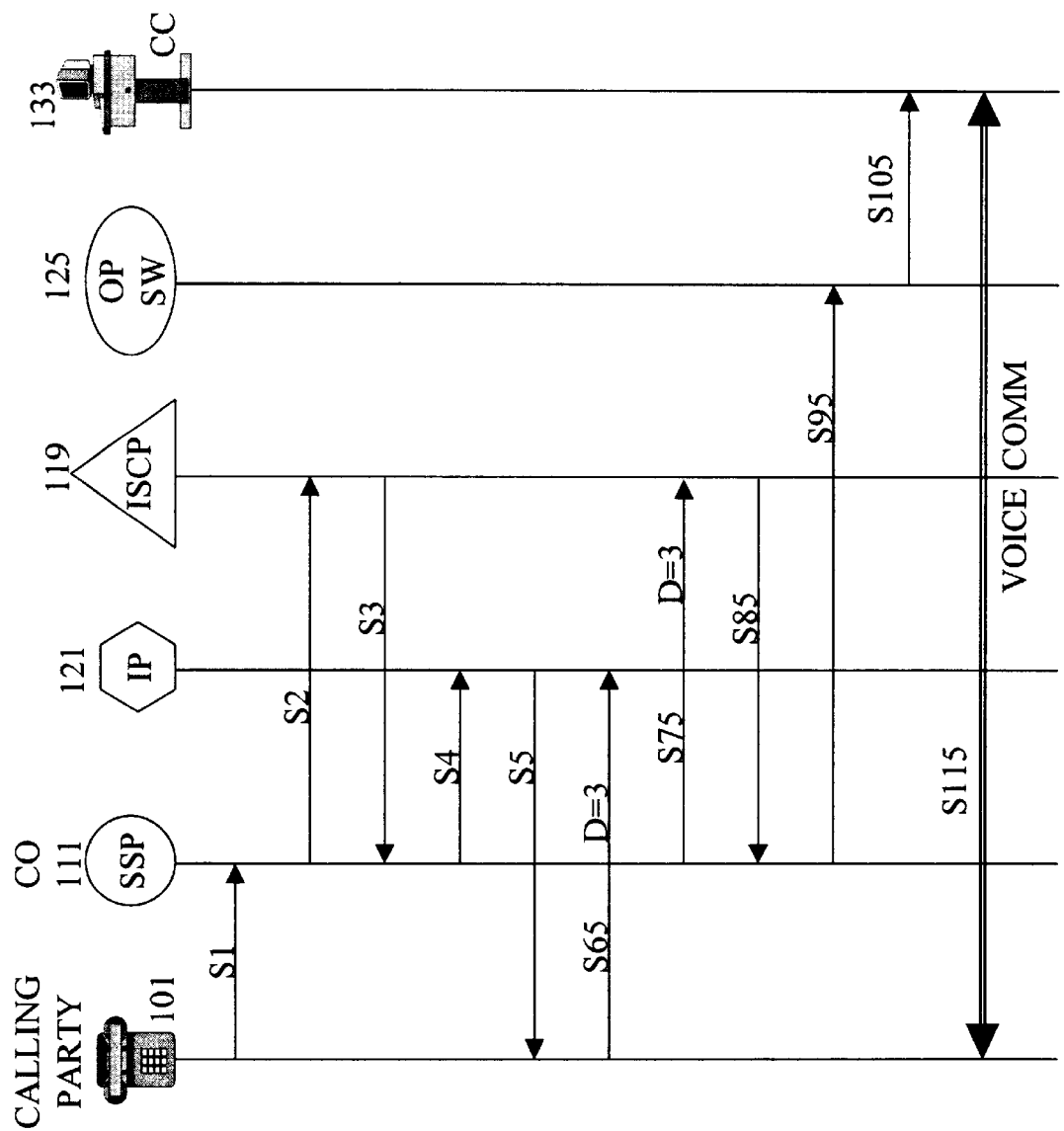
FIG. 5 is a signal flow diagram useful in explaining the flow of call processing for a request for busy verification.

Consider now the scenario of FIG. 5, in which the caller desires to obtain a busy line verification. Again, like steps from the earlier examples are indicated by similar reference numerals. The caller dials the 0– at step S1, and the SSP CO 111 sends the Info_Analyzed type query identifying the 0– call to the ISCP 119 (step S2). The ISCP 119 retrieves the CPR for 0– calls and sends back the Send_to_Resource response message with the routing number for the IP 121 (step S3). Upon receiving that response, the end office CO 111 routes the call to the IP 121 (step S4), and the IP 121 plays the initial greeting and starts through the menu announcement (step S5), exactly the same as in the earlier examples.

The busy verification is the third menu option in the illustrated example. The caller listens to the earlier portions of the menu and inputs a 3 after the prompt relating to busy verification (step S65). The IP 121 supplies the dialed digit 3 to the SSP type CO 111 (step not separately shown); and in step S75, the SSP CO 111 formulates a Call_Info_From_Resource message and sends that message to the ISCP 119.

The ISCP recognizes from the 3 as the selection digit that the caller requested a busy verification and thus the need for routing to a live operator. The ISCP 119 therefore formulates an Continue type TCAP response message. In step S85, the ISCP 119 sends the Continue message through one or more of the STPs 115 back to the end office CO 111.

In this situation, the nature of number parameter remains unchanged. At this point, the CO 111 understands that the nature of number is operator request—no digits, for this particular call. Upon receipt of a Continue message, the end office 111 therefore resumes call processing based on the available information, in this case the 0- dialing by the calling station 101. The CO 111 therefore releases the connection to the IP 121 and routes the call as an operator service call over the designated trunk group to the operator switch 125 (step S95). The switch 125 in turn connects the call to an available one of the call completion (CC) operator positions 133 (step S105). Voice communication then ensues between the caller and the operator (step S115), who can perform the desired busy signal verification.

As shown by the detailed example of FIG. 5, the busy verification request does require operator intervention. The method does allow for routing of such calls to an available operator capable of performing the desired service.

In accord with the invention, the customer also has the ability to opt out to an operator by dialing "0" or saying "Operator." Alternatively, in some circumstances, the IP 121 will recognize a default condition such as if the customer dials a # or * in response to any prompt. In either case the network will transfer the call through the telephone operator position switch to an operator's console. Alternatively, if the user does not respond to a prompt, the network will route the call to a live operator. In these cases, the call flow essentially follows the process described above relative to FIG. 5, except that the caller enters one of the other operator related selections or there is a default, and the signaling indicates the particular input or default to the ISCP in step S75.

Figure 6:
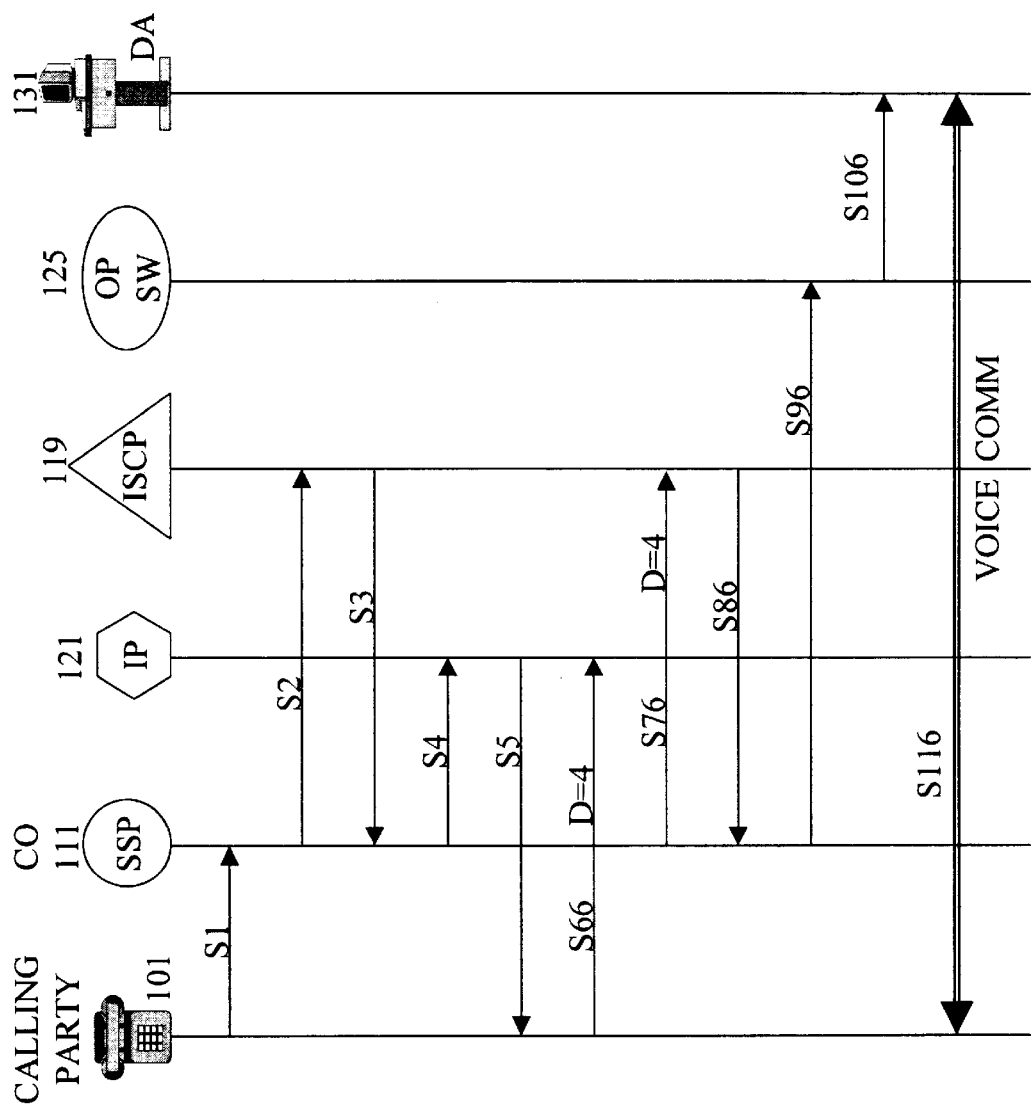
FIG. 6 is a signal flow diagram useful in explaining the flow of call processing for a Directory Assistance call.

Consider now the scenario of FIG. 6, in which the caller desires to obtain directory assistance. Again, like steps from the earlier examples are indicated by similar reference numerals. The caller dials the 0- at step S1, and the SSP CO 111 sends the Info Analyzed type query identifying the 0- call to the ISCP 119 (step S2). The ISCP 119 retrieves the CPR for 0- calls and sends back the Send_to_Resource response message with the routing number for the IP 121 (step S3). Upon receiving that response, the end office 111 routes the call to the IP 121 (step S4) and the IP 121 plays the initial greeting and the menu announcement (step S5), as in the earlier examples.

Directory assistance is the fourth menu option in the present example, therefore the caller listens to the earlier portions of the menu and inputs a 4 after the prompt relating to directory assistance (step S66). The IP 121 supplies the dialed digit 4 to the SSP type CO 111 (step not separately shown); and in step S76, the SSP CO 111 formulates a Call_Info_From_Resource message and sends that message to the ISCP 119.

The ISCP recognizes from the 4 as the selection digit that the caller requested directory assistance. The service therefore requires routing through the operator switch. The routing preferably would go first to an automated directory assistance system, but for ease of discussion here, we will assume that such a system is unavailable and the directory assistance call should go to a live operator, albeit a directory assistance (DA) operator.

The ISCP 119 therefore formulates a Continue type TCAP response message. In step S86, the ISCP 119 sends the Continue message through one or more of the STPs 115 back to the end office CO 111.

In this situation, the ISCP 119 changes the nature of number parameter, even though the call ostensibly should go to a live operator. The Analyze_Route message in this case contains a "national number plan" indicator in the nature of number field, and the message includes 411 as the destination digits.

Upon receipt of the Analyze_Route message, the end office 111 resumes call processing. In this case, the call processing assumes national number plan for the nature of number and uses 411 as the destination digits. To the CO, the call now appears exactly the same as if the caller had originally dialed the 411-directory assistance number. The CO 111 therefore releases the connection to the IP 121 and routes the call as an 411 directory assistance call over the designated trunk group to the operator switch 125 (step S96). The switch 125 in turn connects the call to an available one of the operator positions 131 for directory assistance service (step S106). Voice communication then ensues between the caller and the operator (step S116), who can access the directory database from the position 131 and provide the desired directory listing information. Of course, if an automated directory assistance system were available, the switch 125 would route the 411-directory assistance call first to that system at step S106, in the normal manner.

As shown by the detailed example of FIG. 6, the directory assistance call may require operator intervention. The inventive methodology, however, enables routing of such calls to an available operator capable of performing the desired directory service. The inventive routing also enables routing of such calls to automated directory assistance equipment.

Consider now the scenario of FIG. 7, in which the caller desires to call another service of the carrier, either the carrier's repair service or business office. Again, initial steps (S1 to S5) are the same except that the caller may wait to hear prompts up to the fifth option relating to the repair service or the sixth option relating to the business office. In either case, the caller now inputs the digits for the desired service (S67). For the repair service, the caller inputs the digit 5. For a call to the carrier's business office, the caller inputs the digit 6. As in the earlier examples, the SSP CO 111 formulates a Call_Info_From_Resource message, only here the message contains a 5 or a 6 as the selection digit. The SSP CO 111 sends that message to the ISCP 119 (step S77).

The ISCP recognizes from a 5 as the selection digit that the caller requested a repair service; or the ISCP recognizes from a 6 as the selection digit that the caller requested a call to the business office. The ISCP 119 therefore formulates an Analyze_Route type response message identifying national number plan as the nature of number. The message also contains a destination telephone number, either the number associated with the repair service or the number associated with the business office, as the case may be. In step S87, the ISCP 119 sends that response message through one or more of the STPs 115 back to the end office CO 111.

As in several of the earlier examples, because the ISCP 119 changed the nature of number parameter to that for national numbering plan, the SSP type CO 111 will route the call based on the digits provided in the Analyze_Route type response message. In the present example, the destination digits will be those of the repair service 143 or the business office 145. Upon receipt of the last message, the end office CO 111 therefore releases the connection to the IP 121 and routes the call as if the caller had originally dialed the particular set of digits (step S97), that is to say to either the repair service 143 or the business office 145. Voice communication then ensues between the caller and the desired office personnel (step S107). The end office CO 111 also sends a Resource_Clear message through the CCS network to the ISCP 119, to indicate the release of the connection to the IP 121.

As shown by the detailed example of FIG. 7, calls to the repair service or the business office did not need to go to an operator or even go through the operator switch 125. As a result, no activity of a telephone network operator was required to direct the calls to the appropriate personnel. Similar procedures can be used to efficiently route calls to other selected destinations frequently requested during operator service calls.

The present implementation does not include a menu listing for all ten digits that the user may input in response to the menu announcement. As an example, if the caller inputs a 7, 8 or 1, the ISCP 119 will instruct the 121 to recycle through the menu once. The call will route as described relative to one of the earlier examples if the caller inputs an appropriate digit. If the second cycle through the menu fails to produce an appropriate input or the caller inputs a 7, 8 or 1 again, the system will treat the system will treat the call as a default and route to an operator in a manner similar to that described above relative to FIG. 5.

The above discussion assumed that the selections were entered after the caller heard the appropriate prompt. Those skilled in the art will recognize that typically such systems allow a caller to barge in with a selection. A caller familiar with the menu can input the appropriate selection at any time, and the routing will still proceed essentially as described above relative to FIGS. 3 to 7.

Several other aspects of preferred implementations of the operator services call processing merit brief discussion.

The network will recognize certain default conditions, and the defaults will send the operator service call to an operator. For example, if the network can not route to the menu announcement, for example due to network traffic, the network routes the call: to an operator. To the caller, it looks just like a 0– routing as in today's telephone environment.

If the caller provides an inappropriate or unintelligible response to the menu or another prompt, the front-end platform will repeat the last announcement and give the caller another chance to input an acceptable response. After a second failure, however, the network will again provide default routing to a live operator.

If any call requires live operator assistance, the front-end platform preferably forwards any accumulated data about the call, including any customer inputs to this point of call processing, to the operator switch. The operator switch delivers the data with the voice call to an operator position terminal, for further processing.

The preferred embodiment utilizes the 1129 protocol for the signaling between the ISCP and the IP. However, other implementations of the control and/or the front-end processing resource could use other protocols for the communications to the front-end processing resource, for example the 1298 or 1299 protocols of TCAP.

The above-discussed preferred embodiment utilized an SCP or ISCP for intelligent routing control in combination with an IP for the front-end processing of operator service calls. Those skilled in the art will realize that a variety of other network configurations, particularly intelligent telephone network configurations, could be utilized.

For example, one alternate implementation might utilize a combination of an SCP with a service circuit node (SCN). The intelligent network query and response procedure between an SSP and the SCP would route each 0– call to the SCN. However, from that point in the process, all further front-end operations would be controlled by service logic in the SCN. The SCN would provide the announcements and collect inputs from callers in much the same way as the IP, and the SCN would perform the nature of number conversions, but there would be no need for further communications between the SCN and the SCP to convert the 0– call and route according to the caller input.

As another example, in either the IP embodiment or in an SCN implementation, the SCP functionality may be co-located with or even incorporated into one of the SSP capable COs. Networks with the control functionality resident in an STP also have been proposed. A still further alternative intelligent network might combine the logic functionality attributed to the ISCP or SCP into a common unit with the announcement and input collection elements of the IP or SCN. Essentially, one node would provide routing control as well as the caller interface for the front-end processing. Such an implementation might communicate signaling information with one or more of the COs via dedicated SS7 links sometimes referred to as F-links.

Those skilled in the art will recognize that, particularly as telephone network technology advances, there may be other ways to implement the announcements and digit collection and to control the subsequent automated routing of the operator services calls.

Those skilled in the art also will recognize that the present invention may have a variety of additional applications. For example, the menu and selection responsive call processing could be expanded to include other options that callers might make on operator service calls, such as access to a carrier provided prepaid calling card (debit account) type service.

As another example, the preferred embodiments principally recognized 0– dialing as an explicit request for n operator service, although it was suggested that a spoken request for an "operator" and/or an off-hook followed by a long delay (no-signal type line seizure) could be treated as explicit requests for an operator service. Those skilled in the art will recognize that carriers may choose to define any number of other subscriber activities as explicit requests for an operator service to activate the front-end processing and automated routing in accord with the present invention.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to encompass all such modifications and variations which fall within the true scope of the invention.

What is claimed is:

1. In a telephone network comprising a plurality of interconnected central offices providing switched communication services, a call processing method comprising:

receiving an explicit request for an operator service without more from a station coupled for communication via the network;

responding to the request for operator service by accessing a control resource, and routing the call through the network to a front-end call processing platform;

providing an announcement identifying a plurality of available services from the front-end call processing platform to the station;

receiving a signal from a caller selecting one of the services;

converting the call from an operator service call to a type of call associated with the selected service; and routing the converted call, through the network to a predetermined resource for providing the selected service.

2. A method as in claim 1, wherein the control resource comprises a services control point coupled to an interoffice signaling network in communication with the central offices.

3. A method as in claim 1, wherein the front-end call processing platform comprises an intelligent peripheral coupled to at least one of the central offices.

4. A method as in claim 1, wherein the step of converting converts the call to a call of a type selected from the group consisting essentially of: an emergency call, a 0+ call, a direct call to a business office of a carrier operating the network, a direct call to a network repair service, and a directory assistance call.

5. A method as in claim 1, wherein the step of receiving the signal from the caller selecting one of the services comprises receiving a digit dialed from the station.

6. A method as in claim 1, wherein the step of receiving the signal from the caller selecting one of the services comprises receiving a spoken selection from the caller.

7. A method as in claim 1, wherein the step of routing the call as converted comprises routing the call through the network to a point of presence of a network operated by a carrier previously selected by a subscriber associated with the station for providing the selected service.

8. A method as in claim 1, wherein the step of accessing the control resource and routing the call comprises:

triggering a query from a receiving central office to the control resource;

receiving a routing instruction from the control resource; and routing the call from the receiving central office to the front-end call processing platform based on the routing instruction from the control resource.

9. A method as in claim 1, wherein the step of receiving the explicit request for an operator service comprises detecting a 0– dialing pattern, detecting a spoken request for an "Operator," or detecting a no-signal type seizure of a line to the station.

10. In a telephone network comprising a plurality of interconnected central offices providing switched communication services, a call processing method comprising:

receiving an explicit request for operator service without more from a station coupled for communication via the network in a central office of the network;

responding to the request for operator service by launching a query to a control resource, said query indicating a nature of number corresponding to the explicit request for operator service;

responding to the nature of number indicated in the query by sending a first instruction to the central office and thereby causing the central office to send the call to a front-end call processing platform;

providing an announcement identifying a plurality of available services from the front-end call processing platform to the station;

receiving a signal from a caller selecting one of the services;

sending a second instruction to the central office containing a nature of number associated with the selected service; and routing the call through the network to a predetermined resource for providing the selected service based on the nature of number associated with the selected service.

11. A method as in claim 10, wherein the nature of number associated with the selected service is different from the nature of number corresponding to the explicit request for operator service.

12. A method as in claim 10, wherein the nature of number associated with the selected service is the same as the nature of number corresponding to the explicit request for operator service.

13. A method as in claim 10, wherein the nature of number associated with the selected service indicates national number plan.

14. A method as in claim 13, wherein the routing step routes the call to a destination identified by a number contained in the further instruction to the central office.

15. A method as in claim 14, wherein the routing step routes the call to a public safety answering point (PSAP).

16. A method as in claim 14, wherein the routing step routes the call to a resource providing directory assistance services.

17. A method as in claim 16, wherein the resource providing directory assistance services comprises an automated directory assistance system.

18. A method as in claim 14, wherein the routing step routes the call to a business office or repair service of a carrier operating the network.

19. A method as in claim 10, wherein the nature of number associated with the selected service indicates national number plan—operator request.

20. A method as in claim 19, wherein the routing step comprises routing the call to a resource of a carrier pre-selected by a subscriber associated with the station for providing a certain service to that subscriber.

21. A method as in claim 20, wherein the routing to a resource comprises routing the call to an automated attendant billing system of the pre-selected carrier.

22. A method as in claim 10, wherein:

the control resource comprises a service control point;

the step of launching the query comprises sending the query through an interoffice signaling network to the service control point; and the step of sending a first instruction to the central office comprises sending the first instruction to the central office through the interoffice signaling network.

23. A method as in claim 22, wherein the front-end platform comprises an intelligent peripheral.

24. A system for automatically handing an operator-requested call in a telephone network comprising a plurality of interconnected central offices providing switched communication services, the system comprising:

a control resource for receiving a message from one of the central offices of the network, the message indicating receipt of call from a station initiated by an explicit request for an operator service, wherein the control resource is for providing an instruction to the one central office to redirect the call in response to the message;

a front-end call processing platform for receiving the redirected call, providing an announcement through the network to the station identifying a plurality of available services and receiving a selection of one of the services from a caller, wherein responsive to the caller's selection, the system causes the network to convert the operator service call to a type of call associated with the selected service and initiate routing of the converted call through the network to a predetermined resource for providing the selected service.

25. A system as in claim 24, wherein:

the control resource comprises a centralized control system; and the front-end call processing platform comprises a centralized announcement and input collection system.

26. A system as in claim 25, wherein:

the centralized control system comprises a services control point coupled to an interoffice signaling network in communication with the central offices; and the centralized announcement and input collection system comprises an intelligent peripheral coupled to at least one of the central offices for voice and signaling communications.

27. In a telephone network comprising a plurality of interconnected central offices providing switched communication services, a call processing method comprising:

receiving a call for an explicit request for an operator service without more digits from a station coupled for communication via the network;

responding to the request for operator service by accessing a control resource, and routing the call through the network to a front-end call processing platform;

providing an announcement identifying a plurality of available operator services from the front-end call processing platform to the station;

receiving a signal from a caller selecting one of the operator services;

converting the call from an operator service call to a direct dialed call associated with the selected operator service; and routing the converted call, through the network to a predetermined resource for providing the selected operator service.

28. In a telephone network comprising a plurality of interconnected central offices providing switched communication services, a call processing method comprising:

receiving a call for an explicit request for operator service without more digits from a station coupled for communication via the network in a central office of the network;

responding to the request for operator service by launching a query to a control resource, said query indicating a nature of number corresponding to the explicit request for operator service;

responding to the nature of number indicated in the query by sending a first instruction to the central office and thereby causing the central office to send the call to a front-end call processing platform;

providing an announcement identifying a plurality of available operator services from the front-end call processing platform to the station;

receiving a signal from a caller selecting one of the operator services;

sending a second instruction to the central office containing a nature of number associated with the selected operator service; and routing the call through the network to a predetermined resource for providing the selected operator service based on the nature of number associated with the selected service.

29. A system for automatically handing an operator-requested call in a telephone network comprising a plurality of interconnected central offices providing switched communication services, the system comprising:

a control resource for receiving a message from one of the central offices of the network, the message indicating receipt of call from a station initiated by an explicit request for an operator service, wherein the control resource is for providing an instruction to the one central office to redirect the call in response to the message;

a front-end call processing platform for receiving the redirected call, providing an announcement through the network to the station identifying a plurality of available operator services and receiving a selection of one of the operator services from a caller, wherein responsive to the caller's selection, the system causes the network to convert the operator service call to a direct dialed call associated with the selected operator service and initiate routing of the converted call through the network to a predetermined resource for providing the selected operator service.

* * * * *